(12) United States Patent
Lai

(10) Patent No.: US 9,990,093 B2
(45) Date of Patent: Jun. 5, 2018

(54) TOUCH DISPLAY SUBSTRATE, TOUCH DRIVING METHOD AND LIQUID CRYSTAL DISPLAY PANEL

(71) Applicants: Xiamen Tianma Micro-Electronics Co., Ltd., Xiamen (CN); Tianma Micro-Electronics Co., Ltd., Shenzhen (CN)

(72) Inventor: Qingjun Lai, Xiamen (CN)

(73) Assignees: XIAMEN TIANMA MICRO-ELECTRONICS CO., LTD., Xiamen (CN); TIANMA MICRO-ELECTRONICS CO., LTD., Shenzhen (CN)

( * ) Notice: Subject to any disclaimer, the term of this patent is extended or adjusted under 35 U.S.C. 154(b) by 0 days. days.

(21) Appl. No.: 14/857,713

(22) Filed: Sep. 17, 2015

(65) Prior Publication Data

US 2016/0328056 A1 Nov. 10, 2016

(30) Foreign Application Priority Data

May 8, 2015 (CN) .......................... 2015 1 0232161

(51) Int. Cl.
G09G 5/00 (2006.01)
G06F 3/044 (2006.01)
G06F 3/041 (2006.01)
(52) U.S. Cl.
CPC ............ *G06F 3/044* (2013.01); *G06F 3/0416* (2013.01); *G06F 3/0418* (2013.01)

(58) Field of Classification Search
CPC ........ G06F 3/0418; G06F 3/044; G06F 3/047; G06F 3/0412; G06F 3/0416;
(Continued)

(56) References Cited

U.S. PATENT DOCUMENTS

2011/0084857 A1* 4/2011 Marino ................... G06F 3/044 341/5
2011/0298737 A1* 12/2011 Maeda .................... G06F 3/044 345/173

(Continued)

FOREIGN PATENT DOCUMENTS

CN 103593083 A 2/2014
CN 103823587 A 5/2014
(Continued)

*Primary Examiner* — Jennifer Nguyen
(74) *Attorney, Agent, or Firm* — Faegre Baker Daniels LLP

(57) ABSTRACT

A touch display substrate includes a substrate including a display region and a non-display region; a touch sensing circuit in the non-display region; a plurality of touch sensing electrodes in the display region, the plurality of touch sensing electrodes grouped into at least two touch sensing electrode groups in accordance with distances from the touch sensing electrodes to the touch sensing circuit; and a plurality of touch leads, where one end of each of the touch leads is electrically connected with one of the touch sensing electrodes, and the other end of the touch lead is electrically connected with the touch control circuit. The touch sensing circuit is configured to input touch driving signals of a different frequency to each of the touch sensing electrode groups, and the touch driving signals input to the touch sensing electrodes in the same touch sensing electrode group are of the same frequency.

19 Claims, 5 Drawing Sheets

(58) Field of Classification Search
CPC .......... G06F 2203/04112; G09G 5/003; G09G 3/3696; G09G 3/3648; G09G 2300/0426; H05K 1/0296; H05K 1/029
USPC ........................................ 345/174; 178/18.06
See application file for complete search history.

(56) References Cited

U.S. PATENT DOCUMENTS

| | | | |
|---|---|---|---|
| 2013/0169340 A1 | 7/2013 | Tao et al. | |
| 2014/0139480 A1 | 5/2014 | Seo et al. | |
| 2014/0146009 A1* | 5/2014 | Huang | G06F 3/044 345/174 |
| 2015/0109212 A1* | 4/2015 | Yao | G06F 3/0416 345/173 |
| 2015/0177880 A1* | 6/2015 | Shin | G06F 3/0412 345/174 |

FOREIGN PATENT DOCUMENTS

| | | |
|---|---|---|
| CN | 103926729 A | 7/2014 |
| CN | 104407760 A | 3/2015 |
| CN | 104536636 A | 4/2015 |
| WO | 2015047801 A1 | 4/2015 |

\* cited by examiner

TOUCH DISPLAY SUBSTRATE, TOUCH DRIVING METHOD AND LIQUID CRYSTAL DISPLAY PANEL

CROSS-REFERENCE TO RELATED APPLICATION

This application claims priority to Chinese Application No. 201510232161.8, filed May 8, 2015, which is herein incorporated by reference in its entirety.

TECHNICAL FIELD

The present disclosure relates to a touch display technology and, in particular, relates to a touch display substrate, a touch driving method and a liquid crystal display panel.

BACKGROUND

Currently, display panels with a touch sensing function have increasingly become dominant in the field of display panels. The display panel and the touch panel may be incorporated with each other in various ways to form an in-cell touch panel, an on-cell touch panel or an add-on type touch panel. On the other hand, the display panels with a touch sensing function include capacitive touch display panels, resistive touch display panels, infrared-type touch display panels and so on depending on working principles of the display panels. Among others, the capacitive touch display panel may be a self-capacitive or mutual-capacitive touch display panel. Since touch sensing electrodes are typically arranged inside an outer layer substrate of the self-capacitive touch display panel, the self-capacitive touch panel display has a relatively small thickness and a light weight.

SUMMARY

Embodiments of the present disclosure provide a touch display substrate, a touch driving method and a liquid crystal display panel, wherein the touch sensing electrodes are grouped into at least two touch sensing electrode groups in accordance with different distances from the touch sensing electrodes to a touch sensing circuit, touch driving signals of a different frequency are inputted to each of the touch sensing electrode groups in accordance with the different distances, and the touch driving signals inputted to the touch sensing electrodes in the same touch sensing electrode group are of the same frequency. Since the touch sensing electrodes are grouped into the touch sensing electrode groups based on the distances from the touch sensing electrodes to the touch sensing circuit, and the touch driving signals of a different frequency are inputted to each touch sensing electrode group, thereby reducing the touch detection time of the touch sensing electrodes distant from the touch sensing circuit, and improving a speed of the touch detection.

In a first example, embodiments of the disclosure include a touch display substrate, which includes:
  a substrate including a display region and a non-display region;
  a touch sensing circuit disposed in the non-display region;
  a plurality of touch sensing electrodes arranged as an array in the display region, the plurality of touch sensing electrodes being grouped into at least two touch sensing electrode groups in accordance with distances from the touch sensing electrodes to the touch sensing circuit; and
  a plurality of touch leads, where one end of each of the touch leads is electrically connected with one of the touch sensing electrodes, while the other end of the touch lead is electrically connected with the touch control circuit;
  wherein the touch sensing circuit is configured to input touch driving signals of a different frequency to each of the touch sensing electrode groups, and the touch driving signals inputted to the touch sensing electrodes in the same touch sensing electrode group are of the same frequency.

In a second example, embodiments of the disclosure include a touch driving method for a touch display substrate. The touch display substrate includes: a substrate including a display region and a non-display region; a touch sensing circuit disposed in the non-display region; a plurality of touch sensing electrodes arranged as an array in the display region, where the plurality of touch sensing electrodes are grouped into at least two touch sensing electrode groups in accordance with distances from the touch sensing electrodes to the touch sensing circuit; and a plurality of touch leads, where one end of each of the touch leads is electrically connected with one of the touch sensing electrodes, and the other end of the touch lead is electrically connected with the touch control circuit.

The touch driving method includes
  inputting touch driving signals of a different frequency to each touch sensing electrode group by a touch sensing circuit in a time-division manner, wherein the touch driving signals simultaneously inputted by the touch sensing circuit to the touch sensing electrodes in the same touch sensing electrode group are of the same frequency.

Embodiments of the disclosure include a liquid crystal display panel, which includes a color filter film and the previously described touch display substrate.

The beneficial effects of the disclosure lies in that: the touch sensing electrodes are grouped into at least two touch sensing electrode groups in accordance with different distances from the touch sensing electrodes to the touch sensing circuit, touch driving signals of a different frequency are applied to each touch sensing electrode group in accordance with the different distances, and the touch driving signals applied to the touch sensing electrodes in the same touch sensing electrode group are of the same frequency. The touch sensing electrodes are grouped into the touch sensing electrode groups based on the distances from the touch sensing electrodes to the touch sensing circuit, and the touch driving signals of a different frequency are inputted to each touch sensing electrode group, thereby reducing the touch detection time of the touch sensing electrodes distant from the touch sensing circuit, and improving a speed of the touch detection.

While multiple embodiments are disclosed, still other embodiments of the disclosure will become apparent to those skilled in the art from the following detailed description, which shows and describes illustrative embodiments of the disclosure. Accordingly, the drawings and detailed description are to be regarded as illustrative in nature and not restrictive.

BRIEF DESCRIPTION OF THE DRAWINGS

To illustrate technical solutions of the disclosure, a brief introduction of the accompanying drawings is given below. The accompanying drawings for the description below illustrate some of the embodiments of the disclosure. Other drawings and embodiments may be derived from the accompanying drawings.

Figure 1:
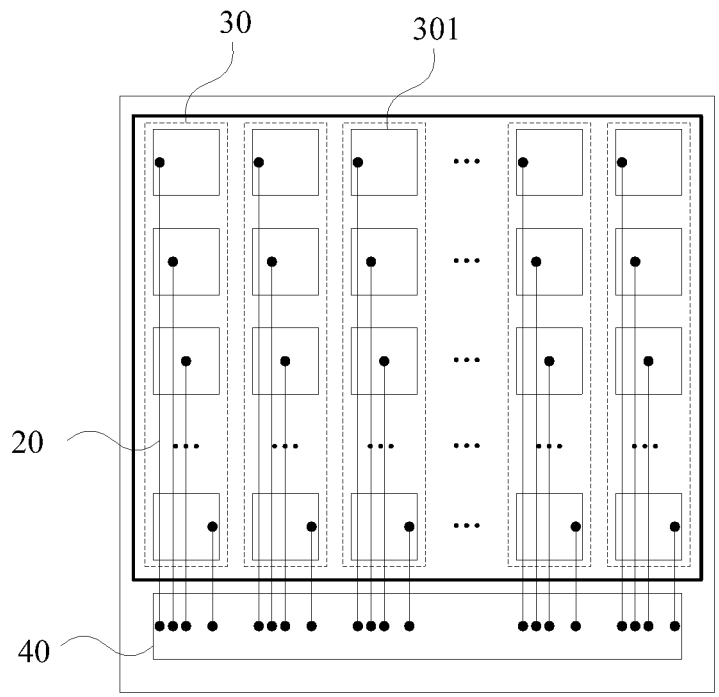
FIG. 1 is a schematic diagram illustrating grouping of touch sensing electrodes during touch detection in the related art.

While the disclosure is amenable to various modifications and alternative forms, specific embodiments have been shown by way of example in the drawings and are described in detail below. The intention, however, is not to limit the disclosure to the particular embodiments described. On the contrary, the disclosure is intended to cover all modifications, equivalents, and alternatives falling within the scope of the disclosure as defined by the appended claims.

DETAILED DESCRIPTION

The technical solutions in the disclosure will be further described in detail below in combination with the accompanying drawings in order to make the technical problem, the adopted technical solution and the achieved technical effect more apparent. The embodiments described herein are a part, but not all, of the embodiments of the disclosure. Other embodiments obtained by those of ordinary skill in the art in light of the described embodiments of the disclosure fall into the scope of the disclosure.

Figure 4:
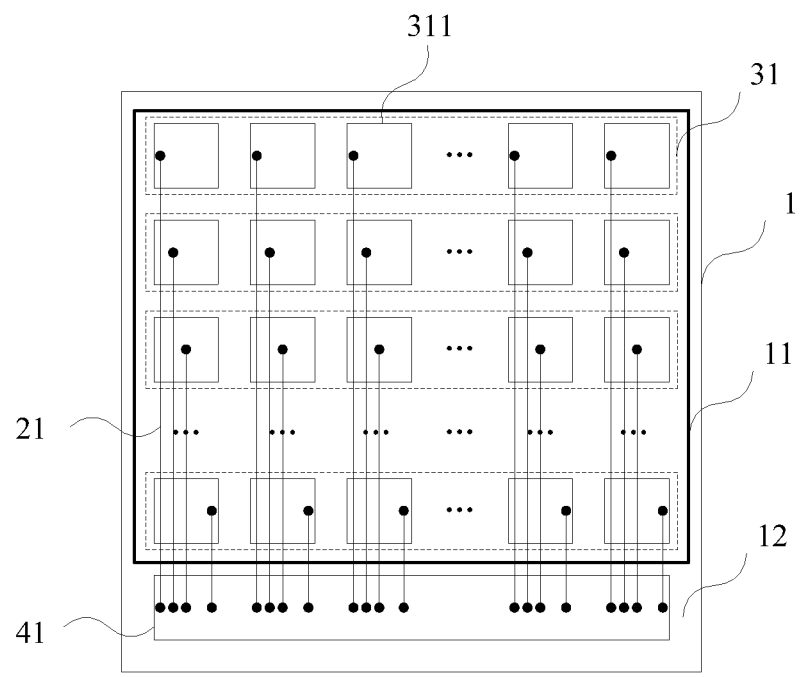
FIG. 4 is a schematic diagram showing a structure of a touch display substrate. according to embodiments of the disclosure.

FIG. 4 is a schematic diagram showing a structure of a touch display substrate, according to embodiments of the disclosure. As shown in FIG. 4, the touch display substrate includes:

a substrate 1 having a display region 11 and a non-display region 12;

a touch sensing circuit 41 disposed in the non-display region 12;

a plurality of touch sensing electrodes 311 arranged as an array in the display region 11, the plurality of touch sensing electrodes 311 being grouped into at least two touch sensing electrode groups 31 in accordance with distances from the touch sensing electrodes 311 to the touch sensing circuit 41; and a plurality of touch leads 21, where one end of each of the touch leads 21 is electrically connected with one of the touch sensing electrodes 311, while the other end of the touch lead 21 is electrically connected with the touch sensing circuit 41. That is, the plurality of touch leads 21 are electrically connected with the plurality of touch sensing electrodes 311, respectively.

The touch sensing circuit 41 is configured to input touch driving signals of different frequencies to different touch sensing electrode groups 31, wherein the touch driving signals input by the touch sensing circuit 41 to the touch sensing electrodes 311 in the same touch sensing electrode group 31 are of the same frequency.

In the related art, as shown in FIG. 1, touch sensing electrodes 301 are arranged in an array including rows and columns of the touch sensing electrodes 301, and a touch sensing circuit 40, which is configured to drive the touch sensing electrodes 301 for touch detection, is disposed at the bottom of the array. The touch sensing electrodes 301 arranged in the array are connected to the touch sensing circuit 40. During the touch detection, all of the touch sensing electrodes 301 are simultaneously detected or touch sensing electrode groups 30 divided from the touch sensing electrodes 301 are sequentially detected, where each of the touch sensing electrode groups 30 includes one or more columns of touch sensing electrodes 301. Because it is very demanding for the performance of the touch sensing circuit 40 if all the touch sensing electrodes 301 are simultaneously detected, the touch sensing electrodes 301 are typically divided into touch sensing electrode groups and the touch detection is performed by groups, where each of the groups may include one column of the touch sensing electrodes 301, for example.

Figure 2:
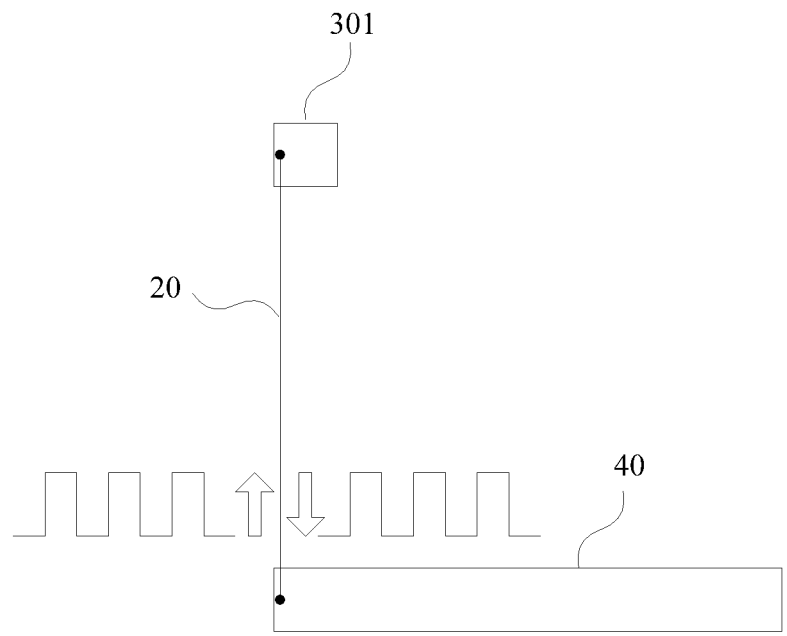
FIG. 2 is a schematic diagram showing principles of the touch detection by touch sensing electrodes in the related art.

As for a certain touch sensing electrode 301, as shown in FIG. 2, when a touch driving signal generated by the touch control circuit 40 is applied to the touch sensing electrode 301 through a touch lead 20, a certain amount of charges are carried by the touch sensing electrode 301. The control circuit 40 can read a change of the charged state of the touch sensing electrode 301 through the touch lead 20, so that it can be determined which electrode(s) 301 is/are touched according to the change of the charged state, and further the location of a touch point can be determined. The touch driving signal and the change of the charged state can both be understood as a pulse signal. As shown in FIG. 2, during the touch detection, the touch sensing circuit 40 transmits a pulse signal through the touch lead 20 to drive the touch sensing electrode 301 and reads a pulse signal through the same touch lead 20 to determine the location of the touch point.

Figure 3:
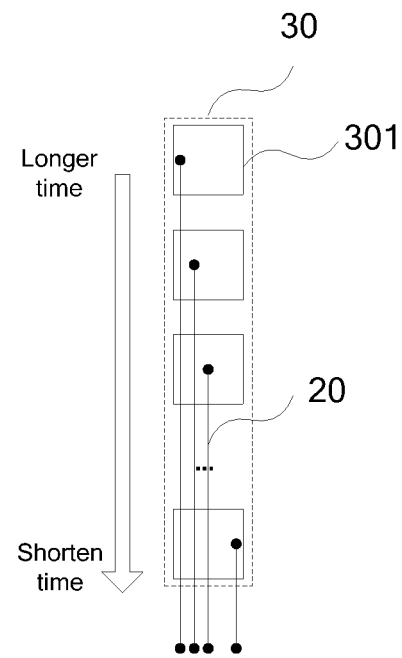
FIG. 3 is a schematic diagram showing the time taken for the touch detection by a single touch sensing electrode group in the related art.

In the touch sensing electrode group 30, as shown in FIG. 3, a touch sensing electrode 301 far away from the touch sensing circuit 40 needs a longer time to complete the touch detection due to a longer capacitive charging delay for the touch sensing electrode 301 far away from the touch sensing circuit 40, while a touch sensing electrode 301 closer to the touch sensing circuit 40 needs a shorter time to complete the touch detection due to a less capacitive charging delay for the touch sensing electrode 301 closer to the touch sensing circuit 40. As such, the time for completing the touch detection as required by the touch sensing electrodes 301 within the same group is decreased as the distances from the touch sensing electrodes to the touch sensing circuit decrease, as indicated by an arrow in FIG. 3.

In other words, when all the touch sensing electrodes 301, which are grouped as above by column, are applied with touch driving signals of the same frequency for touch detection, the total time for completing the touch detection by each touch sensing electrode group 30 is determined by the time for completing the touch detection by a touch sensing electrode 301 in the touch sensing electrode group 30 that is the farthest from the touch sensing circuit 40. As a result, even if the touch detection by a touch sensing electrode 301 in the touch sensing electrode group 30 that is close to the touch sensing circuit 40 has been completed, until the touch detection by a touch sensing electrode 301 in the touch sensing electrode group 30 that is the farthest to the touch sensing circuit 40 has been completed, the touch detection by the next touch sensing electrode group waits and cannot be started. Therefore, in the case of the array with m rows of touch sensing electrodes and n columns of touch sensing electrodes, if the time for completing the touch detection by the farthest touch sensing electrode 301 in each touch sensing electrode group is represented by $t_{max}$, the time for completing the touch detection by all of the n columns of touch sensing electrodes is $t_{max} \times n$.

In the present disclosure, however, the touch sensing electrodes are grouped depending on the distances between the touch sensing electrodes and the touch sensing circuit, that is, the touch detection by all the touch sensing electrodes 301 in each group are basically completed simultaneously, and hence the above-described "waiting" time is eliminated or is very short, thus reducing the overall idle time during the touch detection and improving the touch detection efficiency.

As shown in FIG. 4, the touch sensing electrodes 311 which are located at the same distance from the touch sensing circuit 41 form one touch sensing electrode group 31, that is, each row of the touch sensing electrodes 311 form one touch sensing electrode group 31. With such arrangement of the touch sensing electrode groups 31, there is no idle time (i.e. waiting time) during the touch detection by the touch sensing electrodes 311 in each touch sensing electrode group 31, that is, the touch detection by all the touch sensing electrodes 311 in each touch sensing electrode group 31 is complete simultaneously. In this way, for an array of touch sensing electrodes including m rows of touch sensing electrodes and n columns of touch sensing electrodes, the time for completing the touch detection by the farthest touch sensing electrode 301 relative to the touch sensing circuit 41 is represented by $t_{max}$, the time for completing the touch detection by the second farthest touch sensing electrode 301 relative to the touch sensing circuit 41 is represented by $t_{m-1}$, . . . , the time for completing the touch detection by the second nearest touch sensing electrode 301 relative to the touch sensing circuit 41 is represented by $t_2$, and the time for completing the touch detection by the nearest touch sensing electrode 301 relative to the touch sensing circuit 41 is represented by $t_{min}$, then the time for completing the touch detection for the entire array of touch sensing electrodes is $(t_{min}+t_2+ \ldots +t_{m-1}+t_{max})$. Considering that $t_{min}$ is much less than $t_{max}$, the touch detection based on the arrangement of touch sensing electrode groups in the disclosure can be conducted more efficiently compared to the touch display substrate in the related art.

Figure 5:
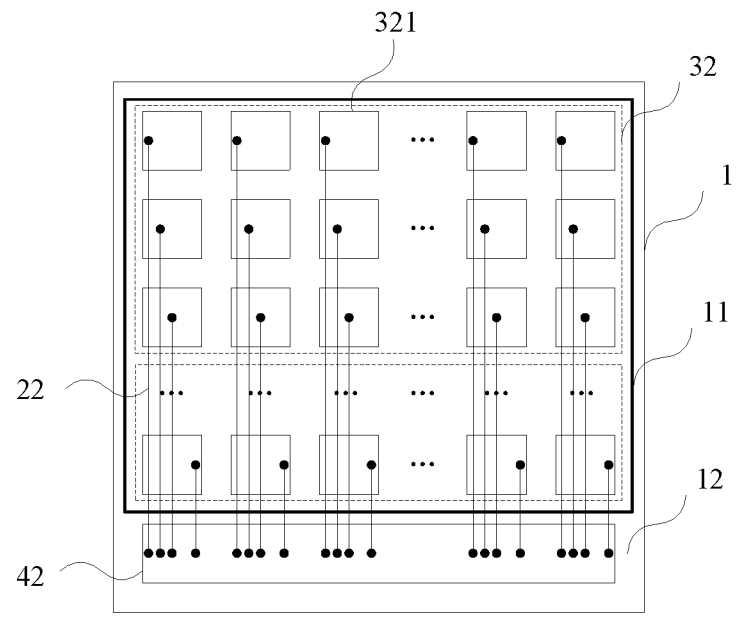
FIG. 5 is a schematic diagram showing another structure of a touch display substrate, according to embodiments of the disclosure.

FIG. 5 is a schematic diagram showing another structure of a touch display substrate, according to embodiments of the disclosure. Each touch sensing electrode group 32 includes more than one row of touch sensing electrodes 321, and is applied with touch driving signals by a touch sensing circuit 42 via touch leads 22, so that the touch detection can be performed more quickly.

Figure 6:
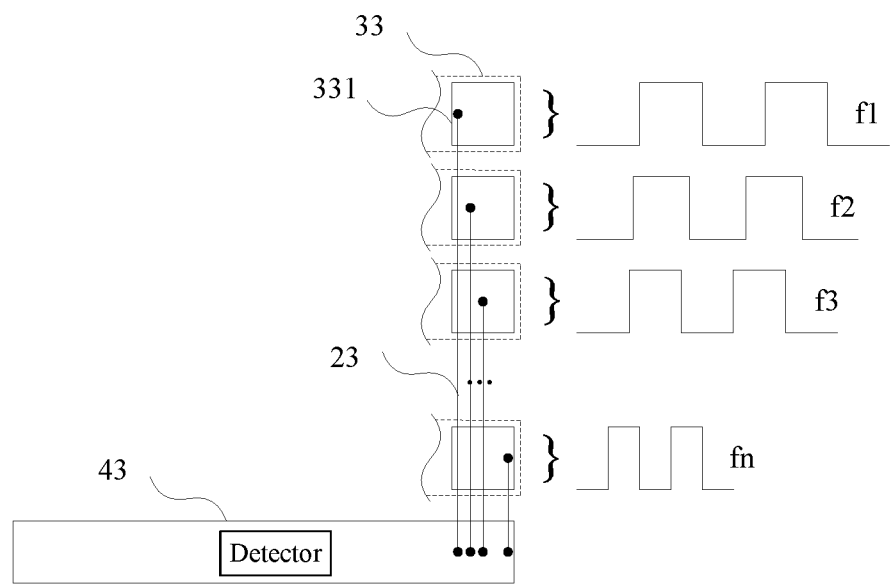
FIG. 6 is a schematic diagram showing a set of pulse inputs to a touch display substrate during the touch detection, according to embodiments of the disclosure.

As shown in FIG. 6, the frequency of touch driving signals applied to a touch sensing electrode group 33 close to a touch sensing circuit 43 is higher than the frequency of touch driving signals applied to a touch sensing electrode group 33 farther away from the touch sensing circuit 43.

The lower frequency of the touch driving signal means a longer cycle of the touch driving signal, which in turn means a longer capacitive charging time. In the disclosure, the touch sensing electrodes 331 in each touch sensing electrode group 33 can be completely charged by the touch control circuit 43 within one uniform cycle, thereby preventing the idle time between different cycles for charging the touch sensing electrodes within the same touch sensing electrode group. The touch sensing electrodes 331 close to the touch sensing circuit 43 can be charged at a higher speed and thus corresponds to a shortened charging cycle. As shown in FIG. 6, if the frequencies of the touch driving signals applied to the touch sensing electrodes 331 sequentially approaching the touch sensing circuit 43 are represented by $f_1, f_2, f_3, \ldots, f_n$, respectively, then $f_1 < f_2 < f_3 < \ldots < f_n$.

In some embodiments, the touch sensing circuit 43 includes a detector for detecting the charging duration of the touch sensing electrodes 331.

The charging duration detected by the detector serves as a basis for adjusting the touch driving signal outputted by the touch sensing circuit 43. For example, if the charging duration of a touch sensing electrode 331 as detected by the detector reaches a preset first threshold value, an initial voltage of the touch driving signal applied to the touch sensing electrode group 33 containing the touch sensing electrode 331 is increased.

The time for fully charging a capacitor is related to capacitance, resistance, a voltage applied thereto, etc. In the disclosure, the capacitance and the resistance are not variable, thus the required charging duration can be altered by a change of the voltage applied to the touch sensing electrode, more specifically, if the applied voltage is increased, the charging duration is shortened. It should be noted that the touch sensing electrode is not necessarily 100% charged for the touch detection, instead, the touch sensing electrode may be 90% to 95% charged for the touch detection.

In some embodiments, if the charging duration of a touch sensing electrode 331 as detected by the detector reaches a preset second threshold value, at least one touch sensing electrode group 33 adjacent to the touch sensing electrode group 33 containing the touch sensing electrode 331 is combined with the touch sensing electrode group 33 containing the touch sensing electrode 331.

Figure 7:
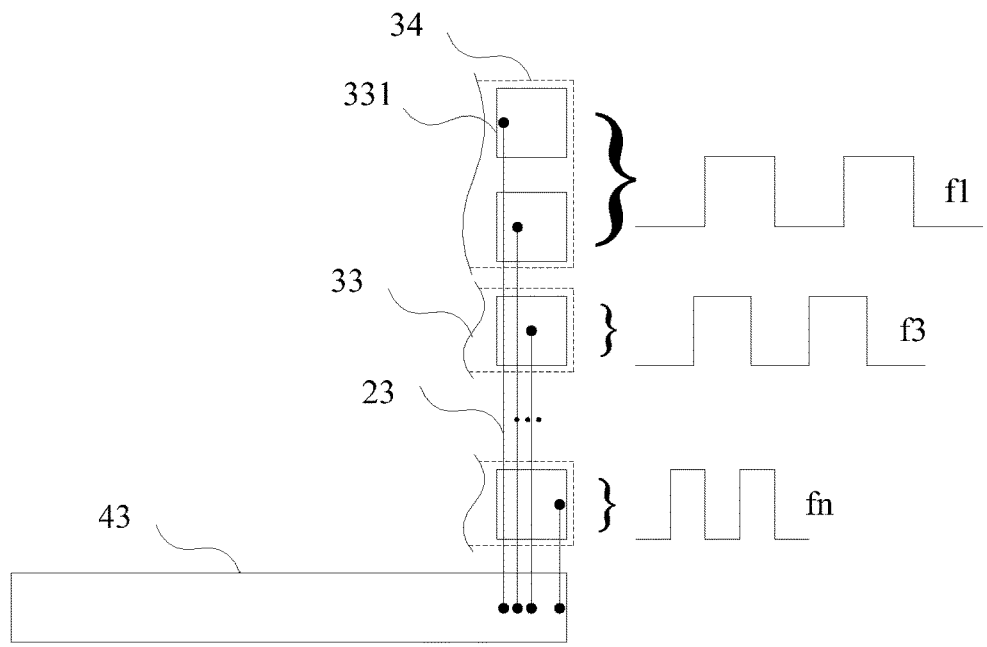
FIG. 7 is a schematic diagram showing another set of pulse inputs to a touch display substrate during the touch detection, according to embodiments of the disclosure.

As shown in FIG. 7, after the adjacent touch sensing electrode groups 33 are combined to obtain a new touch sensing electrode group 34, touch driving signals of the same frequency are applied to the new touch sensing electrode group 34 by the touch sensing circuit 43 via the touch leads 23, thereby further reducing the time required for the touch detection for the entire array of touch sensing electrodes.

In some embodiments, if the charging duration of a touch sensing electrode 331 as detected by the detector reaches the preset second threshold value, the frequency of the touch driving signals applied to the touch sensing electrode group 33 containing the touch sensing electrode 331 is changed.

Further, if the charging duration of the touch sensing electrode 331 as detected by the detector reaches the preset second threshold value, the frequency of the touch driving signals applied to the touch sensing electrode group 33 containing the touch sensing electrode 331 is decreased.

As such, if the charging duration of the touch sensing electrode 331 is too long, the frequency of the touch driving signal applied to the touch sensing electrode group containing the touch sensing electrode 331 is decreased and hence the cycle of the touch driving signal is prolonged, so that the charging of the touch sensing electrode 331 can be completed within one such cycle, thereby improving the speed of the touch detection.

Figure 8:
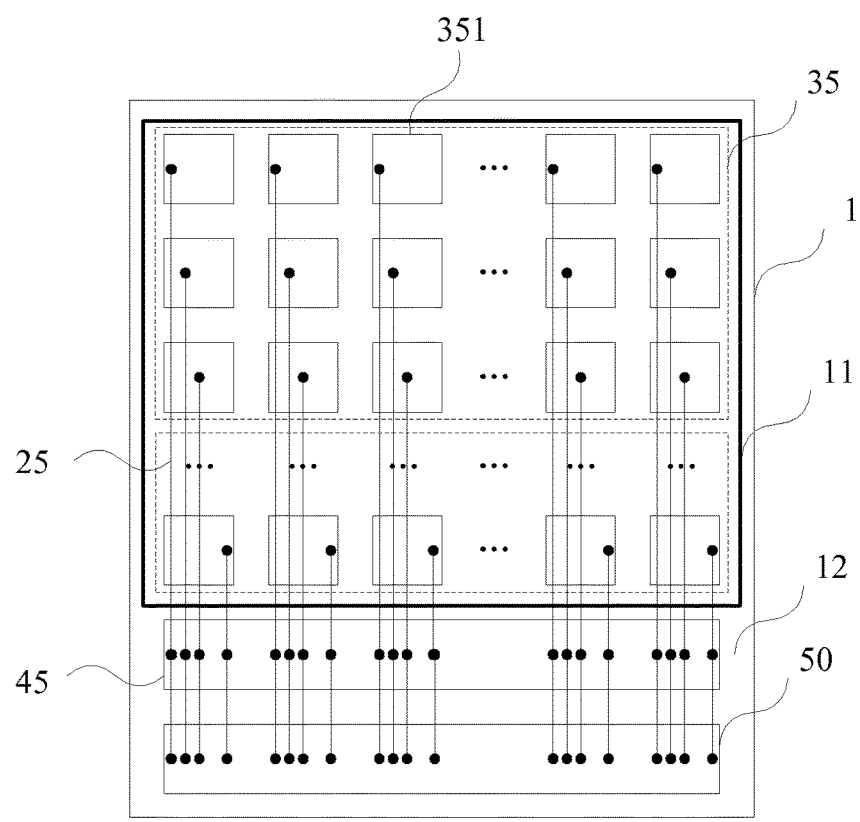
FIG. 8 is a schematic diagram showing a structure of a touch display substrate, according to embodiments of the disclosure.

In some embodiments, as shown in FIG. 8, touch sensing electrodes 351 are also operable as a common electrode in the touch display substrate.

As shown in FIG. 8, both a touch sensing circuit 45 and a display circuit 50 are connected with the touch sensing electrodes 351 through touch leads 25, and the touch sensing electrodes 351 are driven by the touch sensing circuit 45 and the display circuit 50 in a time-division manner. That is, the touch detection performed by the touch sensing circuit 45 alternates with the application of a common voltage by the display circuit 50. Reference may be made to the forgoing description for the implementation of touch sensing electrode groups 35, and the division of the touch sensing electrodes 351 from the common electrode is like in the prior art and thus will not be further described herein.

Embodiments of the disclosure include a touch driving method for a touch display substrate that is suitable for the aforementioned touch display panel. The touch display substrate includes: a substrate including a display region and a non-display region; a touch sensing circuit disposed in the non-display region; a plurality of touch sensing electrodes arranged as an array in the display region, where the plurality of touch sensing electrodes are grouped into at least two touch sensing electrode groups in accordance with distances from the touch sensing electrodes to the touch sensing circuit; and a plurality of touch leads, where one end of each of the touch leads is electrically connected with one of the touch sensing electrodes, and the other end of the touch lead is electrically connected with the touch control circuit.

Figure 9:
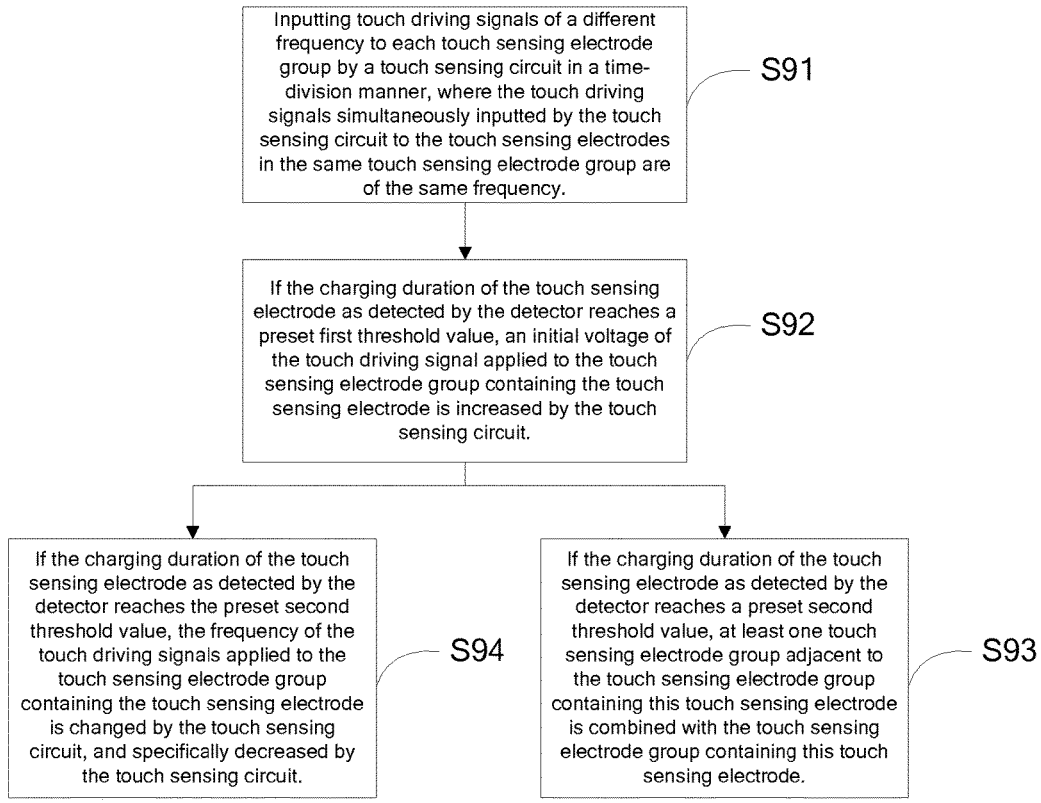
FIG. 9 is a flowchart of a touch driving method of a touch display substrate, according to embodiments of the disclosure.

As shown in FIG. 9, the touch driving method includes Steps S91, S92, S93 and S94 described below.

Step S91: inputting touch driving signals of a different frequency to each touch sensing electrode group by a touch sensing circuit in a time-division manner, where the touch driving signals simultaneously inputted by the touch sensing circuit to the touch sensing electrodes in the same touch sensing electrode group are of the same frequency.

The frequency of the touch driving signals applied to the touch sensing electrode group close to the touch sensing circuit is higher than the frequency of the touch driving signals applied to the touch sensing electrode group farther away from the touch sensing circuit. The touch sensing circuit includes a detector configured to detect the charging duration of the touch sensing electrode.

Step S92: if the charging duration of the touch sensing electrode as detected by the detector reaches a preset first threshold value, an initial voltage of the touch driving signal applied to the touch sensing electrode group containing the touch sensing electrode is increased by the touch sensing circuit.

Step S93: if the charging duration of the touch sensing electrode as detected by the detector reaches a preset second threshold value, at least one touch sensing electrode group adjacent to the touch sensing electrode group containing this touch sensing electrode is combined with the touch sensing electrode group containing this touch sensing electrode.

Step S94: if the charging duration of the touch sensing electrode as detected by the detector reaches the preset second threshold value, the frequency of the touch driving signals applied to the touch sensing electrode group containing the touch sensing electrode is changed by the touch sensing circuit, and specifically decreased by the touch sensing circuit.

Embodiments of the disclosure also provide a liquid crystal display panel, which includes a color filter film 2 and the previously described touch display substrate.

Figure 10:
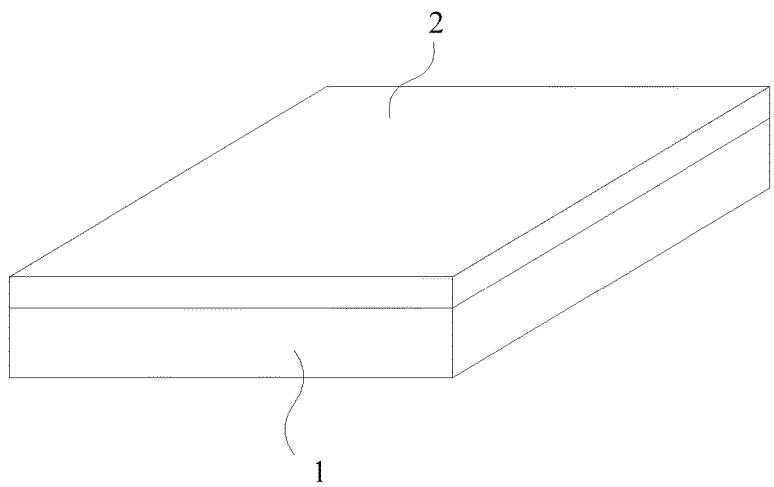
FIG. 10 is a schematic diagram showing a structure of a liquid crystal display panel, according to embodiments of the disclosure.

The liquid crystal display panel includes a color filter film 2 and the above described touch display substrate as shown in FIGS. 8 and 10. A touch sensing circuit 45, a display circuit 50 and other integrated circuits for achieving other auxiliary functions are disposed in a display region 11, and the region on the substrate 1 except for the display region 11 is referred to as a non-display region 12.

As such, the touch sensing electrodes 351 are grouped into at least two touch sensing electrode groups 35 in accordance with different distances from the touch sensing electrodes 351 to the touch sensing circuit 45, touch driving signals of a different frequency are applied to each touch sensing electrode group 35 in accordance with the different distances, and the touch driving signals applied to the touch sensing electrodes 351 in the same touch sensing electrode group 35 are of the same frequency. Since the touch sensing electrodes are grouped into the touch sensing electrode groups 35 based on the distances from the touch sensing electrodes to the touch sensing circuit, and the touch driving signals of a different frequency are inputted to each touch sensing electrode group 35, thereby reducing the time for the touch detection by the touch sensing electrodes 351 distant from the touch sensing circuit, and improving a speed of the touch detection.

The technical principles of the disclosure are described in conjunction with examples. The descriptions above are used for explaining the principles of the disclosure and should not be understood as limiting the scope of the disclosure in any way. Based on the explanation herein, other implementations of the disclosure may be conceived by those skilled in the art without paying any creative labor and fall within the scope of the disclosure.

Various modifications and additions can be made to the exemplary embodiments discussed without departing from the scope of the disclosure. For example, while the embodiments described above refer to particular features, the scope of this disclosure also includes embodiments having different combinations of features and embodiments that do not include all of the described features. Accordingly, the scope of the disclosure is intended to embrace all such alternatives, modifications, and variations as fall within the scope of the claims, together with all equivalents thereof.

I claim:

1. A self-capacitive touch display substrate, comprising
a substrate including a display region and a non-display region;
a touch circuit disposed in the non-display region;
a plurality of touch sensing electrodes arranged as an array in the display region, wherein the plurality of touch sensing electrodes are grouped into touch sensing electrode groups, wherein each of the touch sensing electrode groups includes a first touch sensing electrode and a second touch sensing electrode, a distance between the first touch sensing electrode and the touch circuit is equal to a distance between the second touch sensing electrode and the touch circuit and
a plurality of touch leads, wherein one end of each of the touch leads is electrically connected with one of the touch sensing electrodes, while the other end of the touch lead is electrically connected with the touch control circuit;

wherein the touch circuit is configured to supply driving signals to the touch sensing electrode groups, and wherein frequencies of the driving signals received by touch sensing electrode groups that are positioned at greater distances from the touch circuit are smaller than frequencies of the driving signals received by touch sensing electrode groups that are positioned at smaller distances from the touch circuit, respectively, and wherein each touch sensing electrode in a same touch sensing electrode group receives the same driving signal.

2. The self-capacitive touch display substrate of claim 1, wherein the touch sensing electrodes which are located at the same distance from the touch circuit are grouped into the same touch sensing electrode group.

3. The self-capacitive touch display substrate of claim 1, wherein the touch circuit comprises a detector for detecting a charging duration of the touch sensing electrode.

4. The self-capacitive touch display substrate of claim 1, wherein the touch sensing electrodes are operable as a common electrode of the touch display substrate.

5. The self-capacitive touch display substrate of claim 1, wherein the touch circuit is configured to simultaneously input touch driving signals to the touch sensing electrode groups.

6. The self-capacitive touch display substrate of claim 1, wherein the touch circuit is configured to sequentially input touch driving signals of different frequencies to the touch sensing electrode groups.

7. The self-capacitive touch display substrate of claim 1, wherein the touch circuit is further configured to read a change of a charge state of each of the plurality of touch sensing electrodes.

8. A touch driving method for a self-capacitive touch display substrate, wherein the self-capacitive touch display substrate comprises:
a substrate including a display region and a non-display region; a touch circuit disposed in the non-display region; a plurality of touch sensing electrodes arranged as an array in the display region, wherein the plurality of touch sensing electrodes are grouped into two touch sensing electrode groups, wherein each of the touch sensing electrode groups includes a first touch sensing electrode and a second touch sensing electrode, a distance between the first touch sensing electrode and the touch circuit is equal to a distance between the second touch sensing electrode and the touch circuit; and a plurality of touch leads, wherein one end of each of the touch leads is electrically connected with one of the touch sensing electrodes, while the other end of the touch lead is electrically connected with the touch control circuit; and
the touch driving method comprises supplying touch driving signals to the touch sensing electrode groups, respectively, wherein frequencies of the driving signals received by touch sensing electrode groups that are positioned at greater distances from the touch circuit are smaller than frequencies of the driving signals received by touch sensing electrode groups that are positioned at smaller distances from the touch circuit, respectively, and wherein each touch sensing electrode in a same touch sensing electrode group receives the same driving signal.

9. The touch driving method of claim 8, wherein the touch circuit comprises a detector configured to detect a charging duration of the touch sensing electrode.

10. The touch driving method of claim 9, wherein if the charging duration of the touch sensing electrode as detected by the detector reaches a preset first threshold value, an initial voltage of the touch driving signal applied to the touch sensing electrode group containing the detected touch sensing electrode is increased by the touch circuit.

11. The touch driving method of claim 9, wherein if the charging duration of the touch sensing electrode as detected by the detector reaches a preset second threshold value, at least one touch sensing electrode group adjacent to the touch sensing electrode group containing the touch sensing electrode is combined with the touch sensing electrode group containing the detected touch sensing electrode.

12. The touch driving method of claim 9, wherein if the charging duration of the touch sensing electrode as detected by the detector reaches a preset second threshold value, the frequency of the touch driving signals applied to the touch sensing electrode group containing the detected touch sensing electrode is changed by the touch circuit.

13. The touch driving method of claim 12, wherein if the charging duration of the touch sensing electrode as detected by the detector reaches the preset second threshold value, the frequency of the touch driving signals applied to the touch sensing electrode group containing the detected touch sensing electrode is decreased.

14. The touch driving method of claim 8, wherein touch driving signals are simultaneously inputted to the touch sensing electrode groups.

15. The touch driving method of claim 8, wherein touch driving signals are sequentially inputted to the touch sensing electrode groups.

16. A liquid crystal display panel, comprising a color filter film and a self-capacitive touch display substrate, wherein the self-capacitive touch display substrate comprises:
a substrate including a display region and a non-display region;
a touch circuit disposed in the non-display region; and
a plurality of touch sensing electrodes arranged as an array in the display region, wherein each of plurality of touch sensing electrodes is electrically connected to the touch circuit via a touch lead, the plurality of touch sensing electrodes are grouped into touch sensing electrode groups, wherein each of the touch sensing electrode groups includes a first touch sensing electrode and a second touch sensing electrode, a length of the touch lead of the first touch sensing electrode is equal to a length of the touch lead of the second touch sensing electrode;
wherein the touch circuit is configured to supply driving signals to the touch sensing electrode groups, different touch sensing electrode groups receive driving signals of different frequencies, each touch sensing electrode in a same touch sensing electrode group receives the same driving signal, touch sensing electrode groups having longer touch leads receive driving signals of smaller frequencies than touch sensing electrode groups having shorter touch leads.

17. The liquid crystal display panel of claim 16, wherein the touch circuit is configured to simultaneously input touch driving signals to the touch sensing electrode groups.

18. The liquid crystal display panel of claim 16, wherein the touch circuit is configured to sequentially input touch driving signals of different frequencies to the touch sensing electrode groups.

19. The liquid crystal display panel of claim 16, wherein the touch circuit is further configured to read a change of a charge state of each of the plurality of touch sensing electrodes.

\* \* \* \* \*